United States Patent
Shafer et al.

(10) Patent No.: US 8,122,798 B1
(45) Date of Patent: Feb. 28, 2012

(54) POWER CUTTING TOOL WITH PROXIMITY SENSING SYSTEM

(75) Inventors: David Shafer, Menlo Park, CA (US); David Titzler, Bellevue, WA (US); John Gilbert, Applegate, OR (US)

(73) Assignee: Power Tool Institute, Cleveland, OH (US)

( * ) Notice: Subject to any disclaimer, the term of this patent is extended or adjusted under 35 U.S.C. 154(b) by 170 days.

(21) Appl. No.: 12/478,559

(22) Filed: Jun. 4, 2009

Related U.S. Application Data

(63) Continuation of application No. 12/273,877, filed on Nov. 19, 2008, now abandoned.

(51) Int. Cl.
*B26D 7/24* (2006.01)
*B27B 5/38* (2006.01)
*G08B 13/26* (2006.01)
*G01R 27/26* (2006.01)

(52) U.S. Cl. .............. 83/62.1; 83/58; 83/397; 83/477.2; 340/562; 324/676

(58) Field of Classification Search .................. 83/62.1, 83/58, 477.1, 477.2, 581, DIG. 1, 490, 397.1, 83/471.2, 491, 589, 397; 340/686.5, 686.6, 340/562, 689, 686.1; 318/16, 480; 324/661, 324/688, 676, 548, 658
See application file for complete search history.

(56) References Cited

U.S. PATENT DOCUMENTS 4,170,013 A  10/1979  Black
(Continued)

FOREIGN PATENT DOCUMENTS

EP  1422022 A1  5/2004
(Continued)

*Primary Examiner* — Ghassem Alie

(57) ABSTRACT

A power cutting tool includes a cutting surface, a conductive structure, and first electrode matrix comprising an array of electrical conductors. A moveable blade used to cut an object is located on the cutting surface. When at least one electrical conductor of the first electrode matrix is energized relative to the conductive structure, an electric field extends between the at least one electrical conductor and the conductive matrix to detect the presence of an object in proximity to the electric field.

5 Claims, 7 Drawing Sheets

U.S. PATENT DOCUMENTS

| | | |
|---|---|---|
| 5,081,406 A | 1/1992 | Hughes et al. |
| 5,942,975 A | 8/1999 | Sorenson |
| 6,418,829 B1 | 7/2002 | Pilchowski |
| 6,813,983 B2 | 11/2004 | Gass et al. |
| 6,853,300 B2 | 2/2005 | Kuan |
| 6,922,153 B2 | 7/2005 | Pierga et al. |
| 6,959,631 B2 | 11/2005 | Sako |
| 7,047,854 B2 | 5/2006 | Sako |
| 7,077,039 B2 | 7/2006 | Gass et al. |
| 7,084,779 B2 | 8/2006 | Uneyama |
| 7,171,879 B2 | 2/2007 | Gass et al. |
| 7,173,537 B2 | 2/2007 | Voigtlaender |
| 7,210,383 B2 | 5/2007 | Gass et al |
| 7,225,712 B2 | 6/2007 | Gass et al. |
| 7,231,856 B2 | 6/2007 | Gass et al. |
| 7,284,467 B2 | 10/2007 | Gass et al. |
| 7,352,355 B2 * | 4/2008 | Troxell et al. ................. 345/156 |
| 7,377,199 B2 | 5/2008 | Gass et al. |
| 7,421,315 B2 | 9/2008 | Gass et al. |
| 7,541,816 B1 * | 6/2009 | Liao et al. ..................... 324/676 |
| 2002/0170399 A1 | 11/2002 | Gass et al. |
| 2003/0071727 A1 * | 4/2003 | Haag et al. .................... 340/562 |
| 2003/0131703 A1 | 7/2003 | Gass et al. |
| 2005/0066784 A1 | 3/2005 | Gass |
| 2005/0139057 A1 | 6/2005 | Gass et al. |
| 2005/0155473 A1 | 7/2005 | Gass |
| 2005/0268767 A1 | 12/2005 | Pierga et al. |
| 2006/0096425 A1 | 5/2006 | Keller |
| 2006/0101960 A1 | 5/2006 | Smith et al. |
| 2006/0123960 A1 | 6/2006 | Gass et al. |
| 2006/0123964 A1 | 6/2006 | Gass et al. |
| 2007/0131071 A1 | 6/2007 | Gass et al. |
| 2007/0199622 A1 | 8/2007 | Gass et al. |
| 2008/0041204 A1 | 2/2008 | Gass |
| 2008/0173147 A1 | 7/2008 | Kovarik et al. |
| 2008/0295660 A1 | 12/2008 | Gass et al. |
| 2009/0000443 A1 | 1/2009 | Gass et al. |
| 2010/0037739 A1 * | 2/2010 | Anderson et al. ................. 83/58 |

FOREIGN PATENT DOCUMENTS

| | | |
|---|---|---|
| WO | WO 96/37350 | 11/1996 |

* cited by examiner

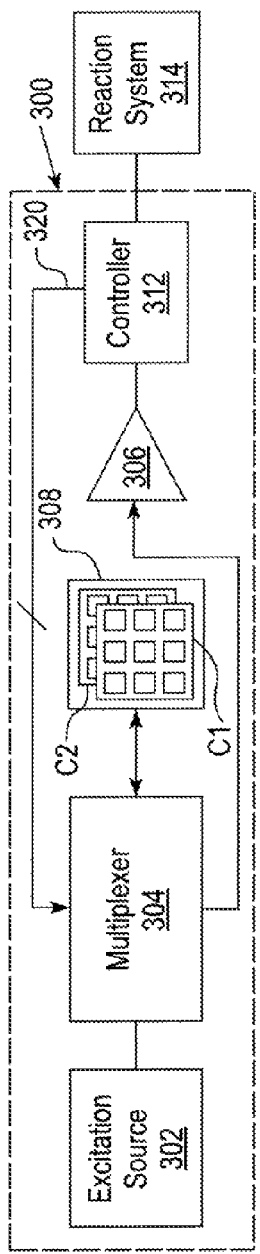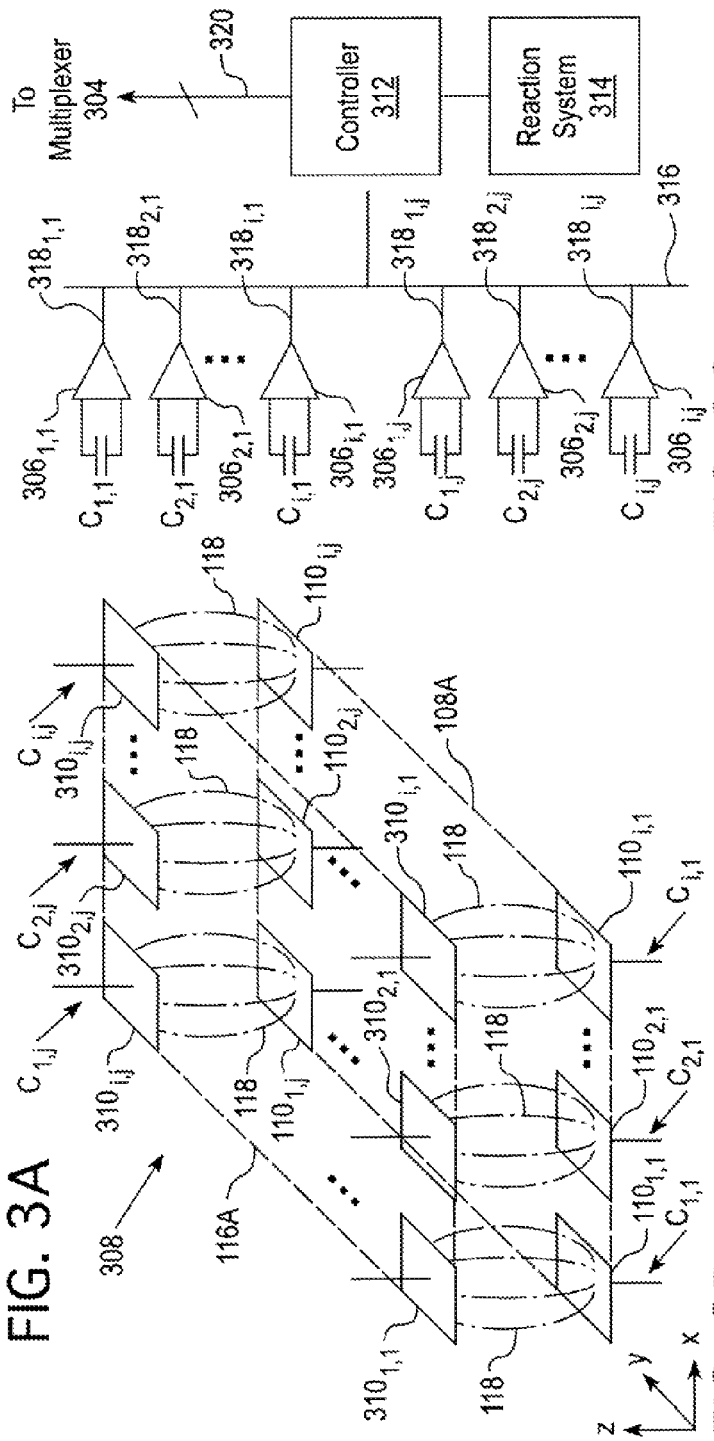

POWER CUTTING TOOL WITH PROXIMITY SENSING SYSTEM

CROSS REFERENCE TO RELATED APPLICATION

This application is a continuation of U.S. application Ser. No. 12/273,877, filed Nov. 19, 2008 now abandoned, titled "POWER CUTTING TOOL WITH PROXIMITY SENSING SYSTEM," which is incorporated herein by reference in its entirety.

BACKGROUND

The present disclosure generally relates to sensing or detecting systems, and more particularly to sensing or detecting systems for power cutting tools.

Detection or sensing systems have been developed for use with various kinds of manufacturing equipment and power tools. Such detection systems are operable to trigger some type of reaction mechanism when certain conditions are sensed or detected. For example, it is known to use a capacitive contact sensing system to detect contact between an operator and a blade of a table saw. In such systems, a signal may be capacitively coupled to the blade and the signal on the blade is monitored to detect changes in the signal indicative of contact between the operator and the blade. Such capacitive sensing systems, however, are only practically able to detect contact between the operator and the blade. Such systems cannot practically detect the proximity of the operator to the blade. Detection systems to detect when the operator or other object comes near or in proximity to the blade may be desirable.

SUMMARY

In one embodiment, a power cutting tool comprises a cutting surface, a conductive structure, a moveable blade to cut an object located on the cutting surface, and a first electrode matrix comprising an array of electrical conductors. When at least one electrical conductor of the first electrode matrix is energized relative to the conductive structure, an electric field extends between the at least one electrical conductor and the conductive matrix to detect the presence of an object in proximity to the electric field.

DESCRIPTION OF THE DRAWINGS

FIG. 3A illustrates one embodiment of a capacitive sensing system for one embodiment of a power cutting tool.

FIG. 3B illustrates one embodiment of a capacitor sensor matrix for the capacitive sensing system shown in FIG. 3A.

FIG. 3C illustrates one embodiment of a detection circuit coupled to a capacitor sensor matrix to detect changes in capacitance of any capacitive sensing nodes of the capacitor sensor matrix shown in FIG. 3B.

DESCRIPTION

Figure 1A:
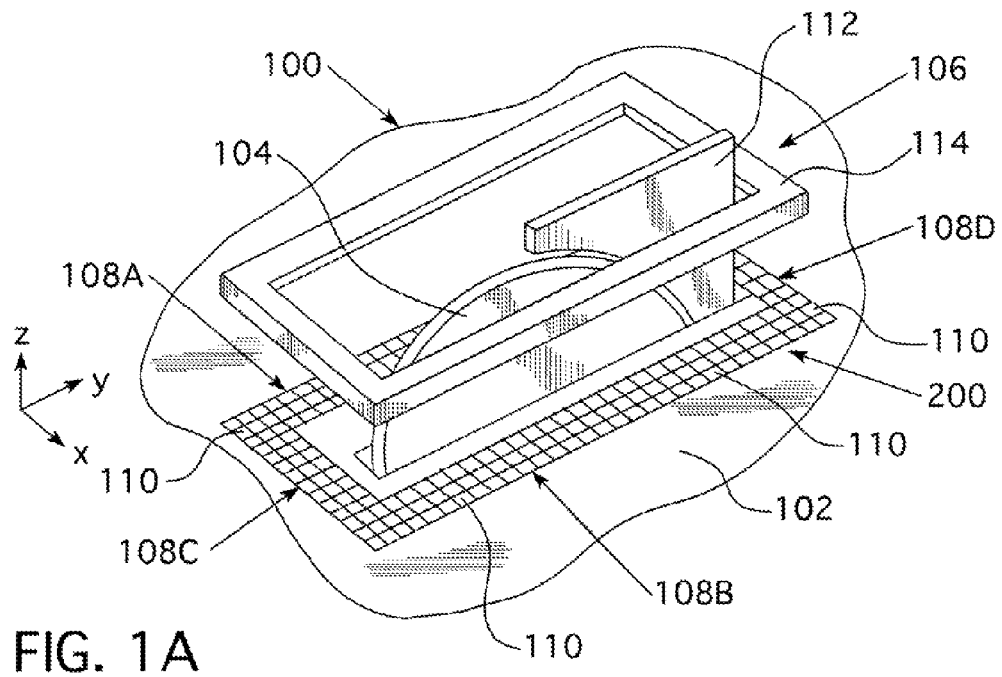
FIG. 1A is a perspective view of one embodiment of a power cutting tool.

The embodiments are directed generally to (i) a proximity sensing system for a power cutting tool and (ii) a power cutting tool, such as a table saw, comprising the sensing system for detecting certain conditions with respect to the blade of the cutting tool. There are several embodiments disclosed herein that relate to overhead frame supports for sensing the presence of an object in proximity to the rotating blade of a table saw. While the embodiments that are shown and described below are implemented in the environment of a table saw, it should be understood that they could also be implemented in other types of power cutting tools, such as miter saws, chop-saws, arm saws, band saws, etc. The use of an overhead frame structure enables accurate detection of the proximity of an object in the detection zones.

One embodiment is directed to a power cutting tool, such as a table saw, comprising a sensing system for detecting a condition with respect to an exposed, moveable blade of the power cutting tool. Several embodiments of the sensing system comprise at least one sensor located above the blade and positioned to (1) monitor one or more volume zones adjacent the blade, (2) detect when an object enters one or more of the zones, and (3) trigger a reaction system in response to the detection.

According to various embodiments, the sensing system comprises a frame connected to the cutting platform (e.g., a table where the power cutting tool is a table saw). The frame may be spaced apart from and parallel to the cutting surface, and may surround at least a portion the blade. The frame may comprise an arrangement of frame sensing elements. In one embodiment, the frame sensing elements may comprise an arrangement of electrically conductive electrode elements arranged in n (rows)×m (columns) (where n=m in certain embodiments, but in other embodiments n≠m) facing the electrically conductive frame and may be referred to herein as a frame electrode matrix. The elements may be arranged in a rectangular pattern and may be positioned adjacent to each other. In one embodiment, the elements may be arranged in a rectangular pattern and may be positioned substantially parallel to each other. The sensing system also may comprise an arrangement of table sensing elements. In one embodiment, the table sensing elements may comprise an electrically conductive region on the cutting surface. The electrically conductive region also may comprise an arrangement of electrically conductive electrode elements arranged in i (rows)×j (columns) (where i=j in certain embodiments and where i=n and j=m in certain embodiments) and referred to herein as a table electrode matrix. These elements also may be arranged in a rectangular pattern and may be positioned orthogonally relative to each other. When energized, one or more electric fields may extend between: (1) the individual electrode elements of the table electrode matrix and the frame electrode matrix; (2) the individual electrode elements of the frame electrode matrix; (3) the individual electrode elements of the table electrode matrix; and/or (4) any combination of these configurations to form individual capacitors. Changes in the electric field between any electrode elements of the matrices may indicate a condition proximate to the blade, which may be used to trigger the reaction system.

In various other embodiments, the sensing system comprises a plurality of electrode elements forming one first of a capacitive matrix and a suitable conductive structure (e.g., a conductive surface) forming a second side of the capacitive matrix. The conductive structure forming the second side of the capacitive matrix may be the frame, the table, the saw blade, throat plate, power line, terminal connected to a common return path for electric current of the motor, or any other suitable conductive structure that may be used as an electrode element of the sensing array. In one embodiment, the conductive structure may be used as one side of the sensing element. Therefore, a plurality of electrode elements may be arranged to form individual capacitors between the plurality of electrode elements and the conductive object. When energized, one or more electric fields may extend between the conductive structure and the individual electrode elements. Changes in the electric field between any electrode elements and the conductive structure indicate a condition proximate to the blade, which may be used to trigger the reaction system.

The sensing and/or detection systems described herein may be used with a reaction system, such as those which either retract and/or stop the blade when certain conditions are detected. One such reaction system, which retracts the blade from the cutting zone when certain conditions are detected, is described in U.S. patent application Ser. No. 11/589,344, filed 30 Oct. 2006, which is hereby incorporated by reference. In addition to or in lieu of such a reaction system, the reaction system for the power cutting tool may reduce the RPM of the motor spinning the blade when the certain conditions are detected. Additionally, the reaction system may sound an audible alarm when certain conditions are detected and/or provide a visual indication that the condition(s) has been detected.

Various embodiments of the sensing system may comprise an n×m frame electrode matrix and an i×j table electrode matrix. For convenience and clarity the following embodiments of frame and table electrode matrices will be described as matrices comprising i×j electrode elements, where n=i and j=m. In various embodiments, the sensing system may be formed by a 1×1 element matrix wherein either n=m=1 or i=j=1. For example, n=m=1 when a conductive structure such as the frame forms one first of the capacitive matrix. Similarly, i=j=1 when a conductive structure such as the conductive table frame forms a first side of the capacitive matrix. The frame and table electrode matrices may operate either individually or in combination on similar principles. An electrode matrix may comprise an array of electrical conductors. Electrical voltage differential across the electrode pairs creates an electric field between the electrode pair and thus forms a capacitor with air acting as the dielectric between the electrode pair. Those skilled in the art will appreciate that the electric current into or out of an electrode is proportional to the rate of change of the electric field in the region near the electrode. Each energized electrode pair may be referred as a sensing node. The electrodes may be arranged as a uni-dimensional or multi-dimensional array of electrical conductors separated by air (or other dielectric). The electrodes may be oriented orthogonally, adjacent, and/or in parallel relative to each other and operate in pairs to form one or more sensing nodes at desired locations on the power cutting tool.

A high frequency signal from an excitation source may be applied sequentially between pairs of first and second electrodes (e.g., sensing nodes) in the electrical conductor array or sensing matrix. The excitation source may be coupled to first and second electrodes to generate an electric field between the electrode pair. The current that passes between the first and second electrodes is proportional to the capacitance of the electrode pair. More generally, the shape of the electric field in the region near the electrodes depends on both the differential voltages applied to the electrodes and on the dielectric constant and conductivity of the objects in proximity of the region. Electrodes may be driven in order to shape the field to optimize detection of objects in a particular region. Varying the field with time or applying a high-frequency excitation voltage, for example, allows the local field strength near each electrode to be measured by measuring the amount of current drawn into or out of each electrode. Therefore, any suitable configuration of electrodes and differential voltages applied thereto that optimizes the difference in the changes to the electric field that is caused by objects (e.g., wood, fingers) in the region in proximity to or between the electrodes may be employed. Electrodes that are not part of the table or the guard (such as the outer table surface, the throat plate, or the blade) may influence setting up the right field configuration, even if they are not sensed as part of the detection system.

The electrode sensing matrices may be operated in multiple modes. To accommodate multi-mode operation of the sensing matrices, in one embodiment, a multiplexer and a switching matrix may be employed to couple selectively the excitation source to the desired electrode pair and to couple a detection circuit to the electrode pair to monitor the effects on capacitance therebetween. The electrode pairs forming the sensing matrices may be excited simultaneously, sequentially, or randomly. Switching between the multiple modes may occur in real time, e.g. "on-the-fly." An object placed in proximity of any energized electrode pairs changes the electric field configuration and thereby changes the capacitance between at least one electrode pair, producing a signal that can be sensed. This may be referred to as a capacitive shunt. For example, when the object is placed in proximity of any energized electrode pairs, some of the electrical field lines from the first electrode are shunted by the object and do not reach the second electrode. This results in a change in the apparent capacitance at that location.

When an object is placed between or in proximity of any sensing node, the change in capacitance between a transmitter coupled to the first electrode and a receiver coupled to the second electrode may be sensed by a detection circuit. The transmitter may be used to provide an excitation source to create an oscillating electric field. If a ground/impedance point, such as an object to be detected, is placed between or in proximity to the transmitter and receiver node electrodes, some of the field lines are shunted away, thus decreasing the apparent capacitance at that point. Accordingly, the total capacitance measured at the receiver node electrode decreases when an object comes close to or in proximity of the induced field at the sensing node. This decrease in capacitance may be sensed by a detection circuit.

In one embodiment, one or more detection circuits may be coupled to the capacitor sensor matrix formed by the various array configurations of electrode pairs. In one embodiment, a single detection circuit may be coupled to the capacitor sensor matrix by way of a switching matrix. In either embodiment, the detection circuits are suitable to detect significant changes in the capacitance at the sensing nodes of the capacitor sensor matrix when an object is located near (e.g., in proximity) the activated electrode pair. In another embodiment, this may be referred to herein as the detection zone of a sensing node. A controller may be coupled to the detection circuits to register activations when an object is located in the detection zone such that the total capacitance between the electrode pair of the sensing node changes to such an extent as to exceed a predetermined threshold level. The controller may comprise preprogrammed threshold levels to determine if the change in capacitance should be registered as an activation event. When the change in capacitance exceeds the predetermined threshold, the controller registers an activation and provides a signal to a reaction system to stop and/or retract the saw blade in the cutting tool, for example.

FIG. 1A is a perspective view of one embodiment of a power cutting tool 100. As previously discussed, in the illustrated embodiment the power cutting tool 100 is a table saw comprising a table top or cutting surface 102 (in the x, y plane), a saw blade 104, and a frame structure 106 above and spaced-apart from the cutting surface 102 (along the z axis). The frame structure 106 in the illustrated embodiment is part of a capacitive sensing system 200 that also comprises table electrode matrices 108A, 108B, 108C, and 108D located on the table top 102. The table electrode matrices 108A-D each may comprise an array or matrix of electrically conductive regions in the form of a rectangular and orthogonal arrangement of electrically conductive electrode elements 110 arranged in i (rows) along the x axis and j (columns) along the y axis. The table electrode matrices 108A-D substantially surround the blade 104 and define multiple detection zones or sensing nodes relative thereto. The table electrode matrices 108A-D may be embedded in or bonded to the table top 102 and may be formed with an electrically insulating top layer. For example, a non-conductive barrier material may be formed or attached over the table electrode matrices 108A-D to prevent wear and tear of the electrically conductive electrode elements 110. The top layer may be formed or otherwise applied to a metal table top.

In the illustrated embodiment, the frame structure 106 may comprise a vertically oriented splitter 112 in the y-z plane positioned behind the blade 104 that extends forwardly over a portion of the exposed blade 104. The splitter 112 may reduce the risk of a kick back condition. The frame structure 106 also may comprise an electrically conductive upper frame 114 mounted to the splitter 112 that generally surrounds the blade 104 above the cutting surface 102. In the illustrated embodiment, the upper frame 114 is rectangular and may be approximately the same size as the table electrode matrices 108A-D on the table top, but spaced apart from the table electrode matrices 108A-D by a distance that varies in accordance with the height of the frame 106 relative to the surface, which may vary with the height of the blade 104. This is because the splitter 112 is preferably connected to the frame structure of the blade assembly so that as the blade 104 is elevated or lowered, the splitter 112 maintains a relatively close spacing relationship with the blade 104 as shown in FIG. 1A. Accordingly, the splitter 112 (and hence the upper frame 114) may move up and down with the blade 104. Thus, the distance between the upper frame 114 and the table electrode matrices 108A-D can vary.

Figure 1B:
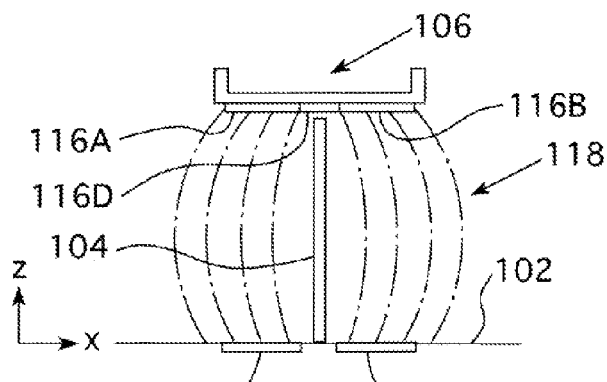
FIG. 1B is a simplified rear view of the embodiment of the power cutting tool shown in FIG. 1A.
Figure 1C:
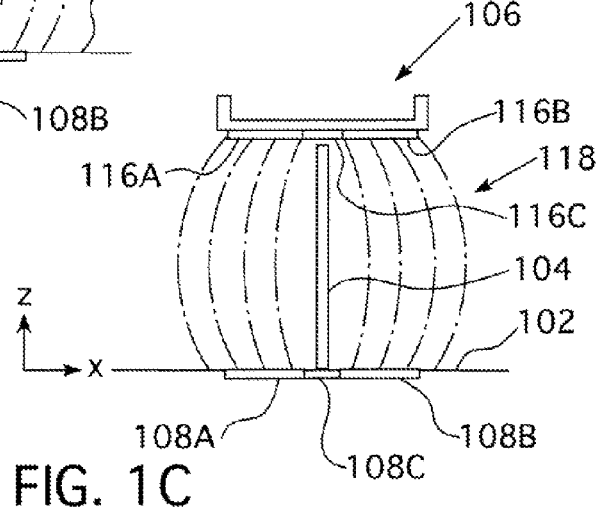
FIG. 1C is a simplified front view of the embodiment of the power cutting tool shown in FIG. 1A.

FIGS. 1B and 1C are simplified rear and front views, respectively, of the embodiment of the power cutting tool shown in FIG. 1A. The upper frame 114 and the table electrode matrices 108A-D are preferably located parallel with each other. The frame structure 106 comprises frame electrode matrices 116A, 116B, 116C, and 116D. The frame electrode matrices 116A-D each may comprise electrically conductive regions in the form of a rectangular or orthogonal arrangement of electrically conductive electrode elements 310 (FIG. 3B) arranged in n (rows) along the x axis and m (columns) along the y axis that substantially surround the blade 104. In other embodiments, the frame electrode matrices 116A-D each may comprise electrically conductive regions in the form of a rectangular or orthogonal arrangement of electrically conductive electrode elements 310 arranged in n (rows)×m (columns) that substantially surround the blade 104 in other orientations. In one embodiment, i=n and j=m, for example. Accordingly, in one embodiment, the table electrode matrices 108A-D and the frame electrode matrices 116A-D each may comprise the same number of electrode elements, although the embodiments are not limited in this context. In one embodiment, the frame table electrode matrices 116A-D may be embedded in or bonded to the frame 106 and may be formed with an electrically insulating top layer. For example, a non-conductive barrier material may be formed or attached over the frame electrode matrices 116A-D to prevent wear and tear of the electrically conductive electrode elements 310.

The table electrode matrices 108A-D located on or adjacent to the cutting surface 102 may be positioned substantially parallel with the frame electrode matrices 116A-D, respectively. The frame structure 106 surrounds the saw blade 104. In the illustrated embodiment, the table electrode matrices 108A-B and the respective frame electrode matrices 116A, B are located on either side of the saw blade 104. The table electrode matrix 108C and the respective frame electrode matrix 116C are located in front of the saw blade 104. And the table electrode matrix 108D and the respective frame electrode matrix 116D are located in the rear of the saw blade 104. The table electrode matrices 108A-D and the corresponding frame electrode matrices 116A-D preferably comprise electrically conductive electrode elements 110. In the illustrated embodiment, the electrically conductive electrode elements 110 are formed as rectangular elements, although in other embodiments electrically conductive electrode elements may be formed of any suitable shape and/or dimension.

The electrically conductive electrode elements 110 may be electrically energized in pairs to form a capacitive sensing node within the capacitor sensor matrix. The electrode pair may be energized relative to each other with an excitation source having sufficient voltage to produce electric field lines 118 that extends between the electrode pair. The electric field is diagrammatically illustrated as curved field lines 118 extending between the energized electrode pair. As diagrammatically illustrated in FIGS. 1B and 1C, in one embodiment, the field lines 118 are formed between electrode pairs spaced apart vertically in the z direction. The capacitance between the electrode pairs is monitored so that if an object is brought into or near the electric field, the capacitance will necessarily change. If the change in capacitance exceeds a predetermined threshold, it may trigger the reaction system. Processing circuitry located in a detection circuit 306 (FIG. 3) or a controller 312 (FIG. 3) can differentiate between various conditions to appropriately trigger the reaction system when a hand of a person, or portion thereof, is detected within the field lines 118.

Figure 2:
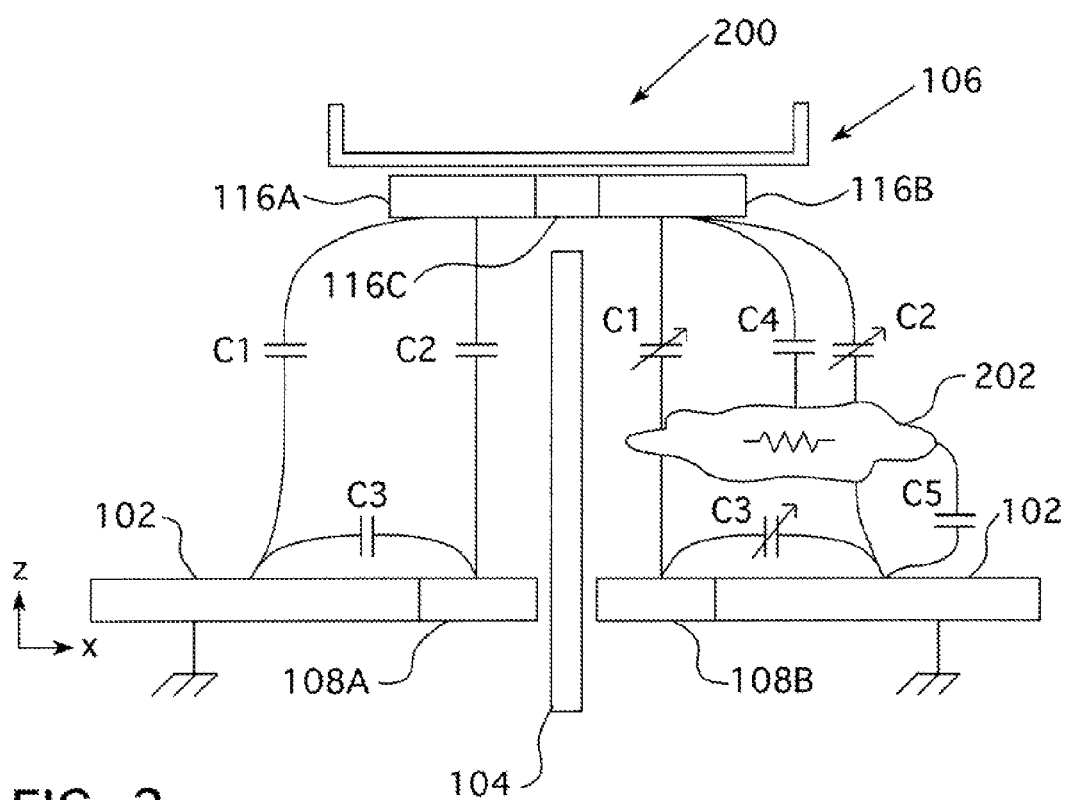
FIG. 2 is a schematic illustration of one embodiment of a capacitive sensing system that may be employed in one embodiment of the power cutting tool shown in FIGS. 1A-C.

FIG. 2 is a schematic illustration of one embodiment of a capacitive sensing system 200 that may be employed in one embodiment of the power cutting tool 100. In one embodiment, the capacitive sensing system 200 employs an electromagnetic field sensing arrangement. In the illustrated embodiment, the power cutting tool is a table saw comprising a table top or the cutting surface 102, the saw blade 104, and the frame structure 106 above and spaced-apart from the cutting surface 102 as shown in FIGS. 1A-C. The table electrode matrices 108A-D are vertically spaced apart from the frame electrode matrices 116A-D along the z axis and are positioned substantially in parallel with respect to each other.

In one embodiment, the table electrode matrices 108A-D may be located on the cutting surface 102 and the frame electrode matrices 116A-D may be located on the overhead frame structure 106. The capacitive sensing system 200 illustrates the cross-coupling between the respective electrode matrices 108A-B, 116A-B. As previously discussed, the electrode matrices 108A-D, 116A-D may comprise individual conductive electrode elements 110 formed of various sizes and shapes and may be small relative to the wavelength of the excitation signal. The electrode elements 110 may be driven or excited with a voltage or excitation source. The current sourced into or out of each electrode element 110 may be measured by one or more electronic elements (e.g., amplifiers, conditioning circuits). The electrical currents sourced to the electrode elements 110 are proportional or sensitive to the dielectric constant and conductivity of objects 202 located in the region in proximity to or between the electrode elements 110, and the coupling of those objects to other electrodes in the system.

For convenience and clarity, capacitances C1-C5 are shown to assist in the understanding of the operation of the capacitive sensing system 200. Accordingly, the capacitances C1, C2, and C3 (as shown to the left of the saw blade 104) are background capacitances measured without the presence of the object 202 between the electrode matrices 108A-D and 116A-D. When the object 202 is located or enters the space between the electrode matrices 108B and 116B, the background capacitances C1, C2, and C3 may change in multiple ways. For example, if the object 202 is grounded (or if the object 202 comprises a large capacitance or impedance to ground), it may decrease the coupling between the electrode matrices 108B and 116B and thus C1 may decrease. Alternatively, the capacitance between the frame electrode matrix 116B and the object 202 may increase as a result of new, parallel conductive paths formed by C4 and C5. Thus, the capacitance C2 may increase because capacitors C4 and C5 are now in parallel with it. The net effect on any capacitance measurement may be an increase or a decrease in capacitance, depending on the conductivity or impedance of the object 202, the dielectric constant of the object 202, and the proximity of the object 202 to other terminals (e.g., ground). Thus, the capacitive sensing system 200 provides information useful to differentiate between various objects 202 formed of different materials while maintaining sensitivity at some distance above the cutting surface 102.

The capacitive sensing system 200 may be configured to be sensitive to the bulk properties of the object 202 in the region proximate or between the electrode matrices 108A-D and 116A-D where one type of material does not necessarily shield another. This may be employed, for example, to detect a human hand under a workpiece that is approaching the saw blade 104. In addition, clothing is unlikely to mask the ability to sense the human hand.

The capacitive sensing system 200 may be employed to sense the object 202 in multiple modes, each of which is discussed in more detail below. In one mode of operation, the table electrode matrices 108A-D located on the cutting surface 102 and the overhead frame electrode matrices 116A-D located in the frame 114 establish electric fields therebetween along the z axis. In other modes, the electric fields may be established between neighboring or adjacent electrode elements 110 of either the table electrode matrices 108A-D or the frame electrode matrices 116A-D along either the x or y axes. Variability in the dielectric constant and the conductivity of the object 202 will cause variable interruptions or current drains from the field lines 118, allowing determination of the position of sensed materials or objects based on the location of the affected electrode elements 110 or sensing nodes of either the table electrode matrices 108A-D or the frame electrode matrices 116A-D. Alternatively or in conjunction therewith, in other modes of operation, the object 202 may be detected utilizing the electric fields established between neighboring or adjacent electrode elements 110 of the table electrode matrices 108A-D to sense materials or objects 202 moving along the cutting surface 102 along the x axis. In yet other modes, the object 202 may be detected utilizing the electric fields established between the neighboring or adjacent electrode elements 110 of the frame electrode matrices 116A-D to sense materials or objects 202 moving along the cutting surface 102 in the detection zones. These various modes of operation may be employed simultaneously, sequentially, or randomly by alternatively energizing a predetermined pair of electrode elements in any one of the matrices 108A-D, 116A-D. In any of these operating modes, the electric field strength or drain current can be sensed by sensing a change in the capacitor formed by an energized pair of electrode elements to detect the presence of the object 202.

In one embodiment, the sensing system 200 such as illustrated in FIGS. 1A-C and 2 may sense proximity of the object 202 to the blade 104 and may prevent a slip condition to prevent the object 202 from contacting the blade 104 by physically blocking the object 202 from the blade 104 by the frame 114. It is also possible to sense conditions that should trigger the reaction system 314 (FIG. 3) at a higher elevation above the table top 102 than can generally be achieved with a capacitive sensing system embedded in the table alone.

FIG. 3A illustrates one embodiment of a capacitive sensing system 300 for one embodiment of a power cutting tool. The capacitive sensing system 300 may be coupled with the power cutting tool 100 and the capacitive sensing system 200 described in FIGS. 1A-C and 2. In the embodiment illustrated in FIG. 3A, an excitation source 302 is coupled to a multiplexer 304 to excite or energize the capacitors in a capacitor sensor matrix 308 comprising a top matrix $C_1$ and a bottom matrix $C_2$ positioned substantially parallel relative to each other. The top matrix $C_1$ comprises arrays of conductive electrode elements (e.g., frame electrode matrices 116A, 116B, 116C, and 116D) and the bottom matrix $C_2$ comprises arrays of conductive electrode elements (e.g., table electrode matrices 108A, 108B, 108C, and 108D). The capacitors may be formed by energizing pairs of the electrode elements in one of multiple modes forming multiple sensing nodes. The multiplexer 304 excites individual capacitors in the capacitor sensor matrix 308. The individual capacitors in the capacitor sensor matrix 308 may be excited simultaneously, sequentially, or randomly. The multiplexer 304 may comprise additional switching logic or switch matrix circuitry to couple the excitation source 302 to a predetermined capacitor in the capacitor sensor matrix 308.

In various embodiments, either the top matrix $C_1$ or the bottom matrix $C_2$ may be formed of a conductive structure or surface such as the frame structure 106, the upper frame 114, the table top or cutting surface 102, the saw blade 104, throat plate, power line, terminal connected to a common return path for electric current of the motor, or any other suitable conductive structure that may be used as an electrode element of the sensing array. In the embodiment where the top matrix $C_1$ is formed of a conductive structure or surface (e.g., the frame structure 106, the upper frame 114, the saw blade 104), the capacitors are formed by energizing the arrays of conductive electrode elements (e.g., table electrode matrices 108A, 108B, 108C, and 108D) of the bottom matrix $C_2$ relative to the conductive structure. In the embodiment where the bottom matrix $C_2$ is formed of a single conductive structure (the table top or cutting surface 102, a power line, throat plate, a terminal connected to a common return path for electric current of the motor), the capacitors are formed by energizing the arrays of conductive electrode elements (e.g., frame electrode matrices 116A, 116B, 116C, and 116D) of the top matrix $C_1$ relative to the conductive structure. The embodiments, however, are not limited in this context.

A detection circuit 306 may be coupled to the capacitor sensor matrix 308 to detect any changes in capacitance of any capacitor. In one embodiment, the detection circuit 306 may comprise multiple detection elements coupled to each capacitor in the capacitor sensor matrix 308. The detection circuit 306 may be implemented as an array of individual amplifiers/detectors. In other embodiments, the detection circuit 306 may comprise a single detection element (e.g., amplifier/detector) coupled to the capacitor sensor matrix 308 by way of a switching matrix to allow sequential or random coupling or connection to the individual energized electrode pairs forming sensing nodes.

The multiplexer 304 couples a predetermined capacitor at a sensing node to a corresponding predetermined detection circuit 306 based on the operational mode. The multiplexer 304 receives mode select inputs 320 from a controller 312 or other processing device.

The controller 312 receives the output of the detection circuit 306 and, when appropriate, provides a signal to register an activation condition when the detection circuit 306 senses a change in capacitance in any of the capacitor sensing nodes of the capacitor sensor matrix 308 that is determined to be representative of an object intrusion. As previously discussed, the capacitance at a sensing node may change when an object comes close (e.g., in proximity) to an energized electrode pair. As described in FIG. 2, the change in capacitance may be a result of the object 202 being located in the region near, around, proximate, and/or between a pair of electrode elements. If the total capacitance between the energized electrode pair changes to such an extent that a set threshold is exceeded, the detection circuit 306 provides a signal to the controller 312 and it is registered as an activation. The controller 312 may comprise preprogrammed threshold levels to determine if the change in capacitance should be registered as an activation event.

As previously discussed, an activation event may be coupled to one or more reaction systems 314, such as those which either retract and/or stop the blade when certain conditions are detected. One such reaction system, for example, retracts the blade from the cutting zone when certain conditions are detected, is described in U.S. patent application Ser. No. 11/589,344, filed 30 Oct. 2006, which is hereby incorporated by reference. In addition to or in lieu of such a reaction system, the reaction system 314 for the power cutting tool 100 may reduce the RPM of the motor spinning the saw blade 104 when the certain conditions are detected such as the presence of the object 202 in proximity of or between the energized electrode element pairs. Additionally, the reaction system may sound an audible alarm when certain conditions are detected and/or provide a visual indication that the condition(s) has been detected. In one embodiment, the table top or cutting surface 102 and/or the overhead frame structure 106 may comprise flashing lights that are energized and/or triggered by the reaction system 314 in response to the sensing system 300 detecting the object 202.

FIG. 3B illustrates one embodiment of a capacitor sensor matrix 308. In the illustrated embodiment, the capacitor sensor matrix 308 may be formed as a portion of the table electrode matrix 108A and the frame electrode matrix 116A configured to operate in a first mode, for example. For convenience and clarity, the operation of the capacitor sensor matrix 308 in the first mode is described with reference to the table electrode matrix 108A and the frame electrode matrix 116A. The principles of operation, however, also apply to the matrices 108B-D and 116B-D. In one embodiment, the table electrode matrix 108A may comprise i rows distributed along the x axis and j columns distributed along the y axis to form a two-dimensional array of electrically conductive electrode elements $110_{1,1}$ to $110_{i,j}$. In one embodiment, the frame electrode matrix 116A also may comprise i rows distributed along the x axis and j columns distributed along the y axis to form a two-dimensional array of electrically conductive electrode elements $310_{1,1}$ to $310_{i,j}$. In a first mode of operation, the capacitive sensing system 300 may be formed as an array of pairs of respective electrically conductive electrode elements $110_{1,1}/310_{1,1}$ to $110_{i,j}/310_{i,j}$ spaced apart vertically along the z axis and positioned in parallel relative to each other. The array of pairs of respective electrically conductive electrode elements $110_{1,1}/310_{1,1}$ to $110_{i,j}/310_{i,j}$ are energized by the excitation source 302 to create the field lines 118 and form corresponding capacitors $C_{1,1}$ to $C_{i,j}$, which may be referred to as the sensing nodes.

As previously discussed, in one embodiment, the table electrode matrix 108A may be configured as a single conductive structure such as the table top or cutting surface 102, a power line, throat plate, a terminal connected to a common return path for electric current of the motor, or any other suitable conductive structure that may be used as an electrode element of the sensing array. In another embodiment, the frame electrode matrix 116A may be configured as a single conductive structure such as the frame structure 106, the upper frame 114, and the saw blade 104. The embodiments are not limited in this context.

In the first mode of operation, the multiplexer/switching matrix 304 couples the corresponding pair of vertically separated electrically conductive electrode elements $110_{1,1}/310_{1,1}$ to $110_{i,j}/310_{i,j}$ to the excitation source 302 to form sensing node capacitors $C_{1,1}$ to $C_{i,j}$. The multiplexer/switching matrix 304 also may be employed to couple the capacitors $C_{1,1}$ to $C_{i,j}$ to the corresponding detection circuit elements $306_{1,1}$ to $306_{i,j}$ (FIG. 3C). For example, in the first mode of operation, the capacitor $C_{1,1}$ sensing node is formed by coupling the excitation source 302 to the pair of electrically conductive electrode elements $110_{1,1}$ and $310_{1,1}$ using the multiplexer/switch matrix 304 and energizing these electrically conductive electrode elements $110_{1,1}$ and $310_{1,1}$ with a suitable amount of energy to create the field lines 118. For convenience and clarity the pairs of electrically conductive electrode elements are denoted as $(110/310)_{i,j}$. These electrode elements $(110/310)_{1,1}$ to $(110/310)_{i,j}$ are coupled to the corresponding detection circuit elements $306_{1,1}$ to $306_{i,j}$.

The excitation source 302 energizes (e.g., creates a voltage differential to create an electric field) the electrode element pairs $(110/310)_{1,1}$ to $(110/310)_{i,j}$ (e.g., sensing nodes) either simultaneously, sequentially, or randomly. The electrical current enters or leaves the electrode element pairs $(110/310)_{1,1}$ to $(110/310)_{i,j}$ and sets up an electric field as indicated by the vertical field lines 118. The electrode element pairs $(110/310)_{1,1}$ to $(110/310)_{i,j}$ may be arranged to operate in pairs and may be oriented orthogonally and/or parallel relative to each other and operate in pairs to form the corresponding capacitors $C_{1,1}$ to $C_{i,j}$. A high frequency signal from the excitation source 302 may be applied to the electrode element pairs $(110/310)_{1,1}$ to $(110/310)_{i,j}$. The current that passes through the electrode element pairs $(110/310)_{1,1}$ to $(110/310)_{i,j}$ is proportional to the capacitance between the first and second electrode element pairs, which are denoted as respective capacitances $C_{1,1}$ to $C_{i,j}$.

FIG. 3C illustrates one embodiment of a detection circuit 306 coupled to the capacitor sensor matrix 308 to detect changes in capacitance of any of the capacitive sensing nodes of the capacitor sensor matrix 308. As shown in FIG. 3C, the detection circuit 306 comprises multiple detection circuits $306_{1,1}$-$306_{i,j}$ coupled to each respective capacitor $C_{1,1}$ to $C_{i,j}$ sensing node and configured to detect any change in their capacitance. The detection circuit 306 may be configured to detect any change in the capacitance between the respective electrode element pair $(110/310)_{1,1\text{-}i,j}$ and provides a corresponding detection signal $318_{i,j}$ to the controller 312 via a bus 316, for example. The detection signals $318_{i,j}$ may indicate a sensed condition to the controller 312 when they exceed a predetermined threshold. The detection signal $318_{i,j}$ may be digital or analog. The controller 312 outputs a signal to the reaction system 314 when the detection signal $318_{i,j}$ exceeds the predetermined threshold.

Figure 4:
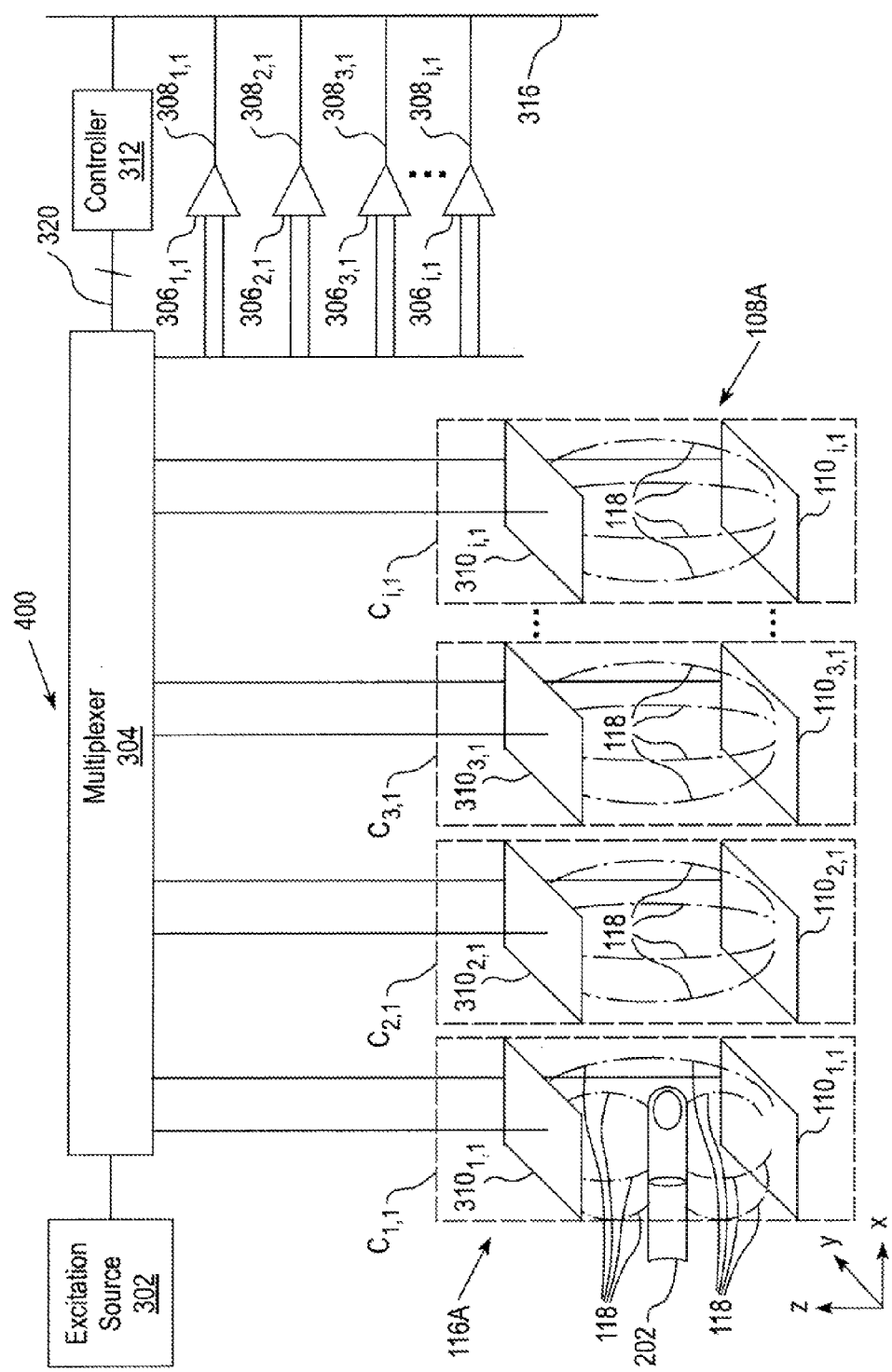
FIG. 4 illustrates one embodiment of a capacitive sensing system operating in a first mode.

FIG. 4 illustrates one embodiment of a capacitive sensing system 400 operating in a first mode. FIG. 4 also illustrates distortion or interference of the field lines 118 when a virtual ground or impedance point, such as the object 202, is placed between or in proximity to the sensing node formed by electrode element pair $(110/310)_{1,1}$, for example. In the illustrated embodiment, the object 202 interferes with the field lines 118 created between the energized electrode element pair $(110/310)_{1,1}$. Accordingly, some of the vertical field lines 118 from the first electrode $110_{1,1}$ are shunted and do not reach the second electrode $310_{1,1}$ resulting in a change in the apparent capacitance at that sensing node as described in FIG. 2, for example. If the object 202 inserted into the space between the electrode element pair $(110/310)_{1,1}$ and the return electrode of the excitation source 302 and one of the electrode elements $110_{1,1}$ or $310_{1,1}$ is connected to the same point (e.g., ground), the vertical field lines 118 are shunted to the same ground or impedance point connected to the excitation source 302 resulting in a change in the apparent capacitance at that sensing node as described in FIG. 2. The capacitive shunt detection method senses the change in capacitance between a transmitter node coupled to the first electrode $110_{1,1}$ and a receiver node coupled to the second electrode $310_{1,1}$. The transmitter node (e.g., the first electrode $110_{1,1}$) and the receiver node (e.g., the second electrode $310_{1,1}$) may be interchanged. The transmitter creates an oscillating electric field. If a ground or impedance point, such as the object 202 to be detected, is placed proximately or in between the transmitter and receiver nodes (e.g., electrodes $110_{1,1}/310_{1,1}$), some of the vertical field lines 118 are shunted away, decreasing the apparent capacitance at the sensing node and the total capacitance measured at the receiver node electrode $310_{1,1}$ decreases.

Figure 5:
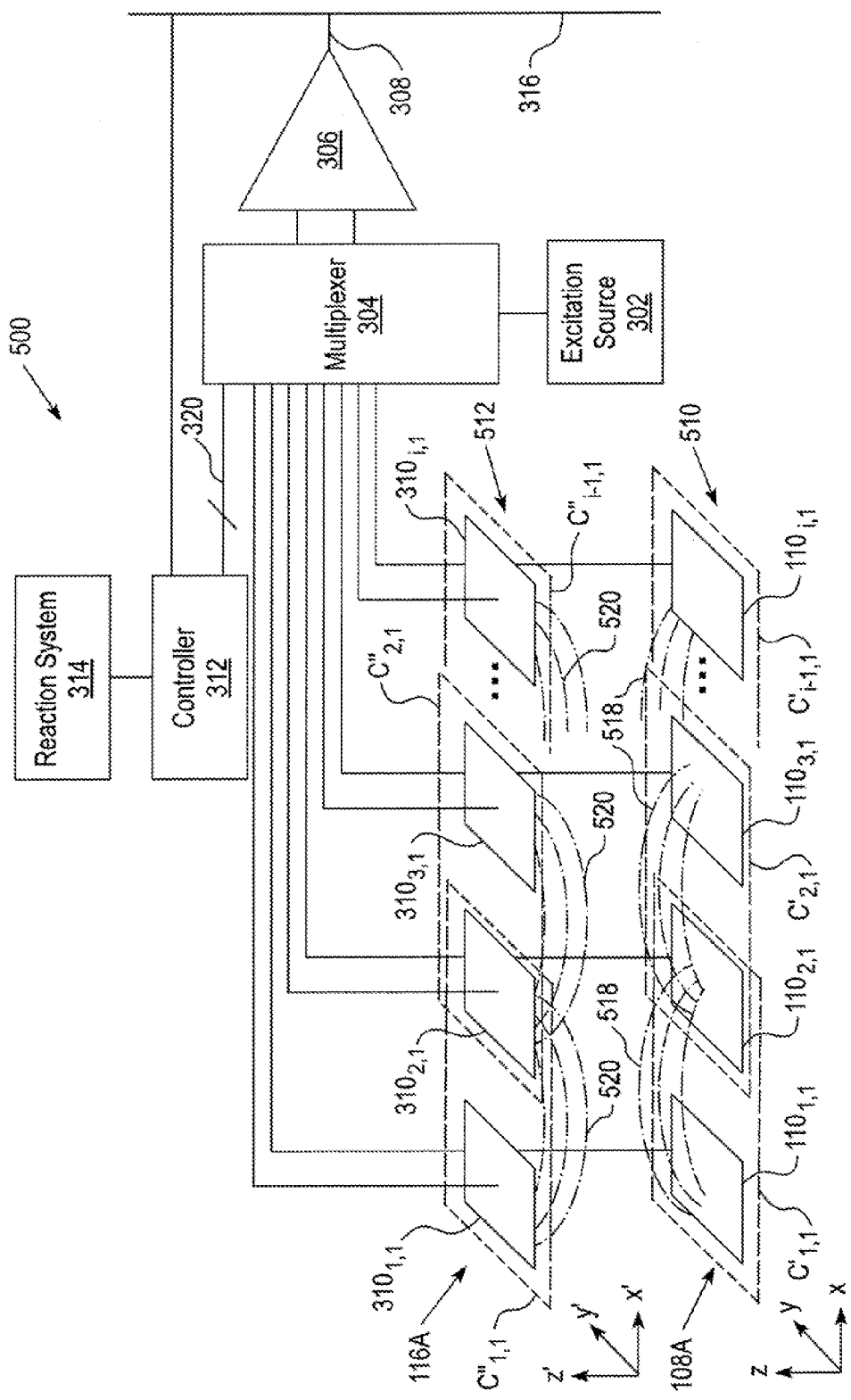
FIG. 5 illustrates one embodiment of a capacitive sensing system operating in second mode and a third mode.

FIG. 5 illustrates one embodiment of a capacitive sensing system 500 operating in a second and a third mode. For convenience and clarity, the second and third modes of operation of the capacitor sensor matrix 308 in the capacitive sensing system 500 are described with reference to the table electrode matrix 108A and the frame electrode matrix 116A portions of the capacitor sensor matrix 308. The principles of operation also apply to the matrices 108B-D and 116B-D.

In the second mode of operation, a table capacitor matrix system 510 (C') comprises a two-dimensional array of (i−1)× (j) individual capacitors formed by energizing neighboring electrode elements in the table x-y plane. As shown, a capacitor $C'_{1,1}$ sensing node may be formed by energizing adjacent neighboring electrode elements $110_{1,1}$ and $110_{2,1}$ of the table electrode matrix 108A along the x axis with the excitation source 302 and generating an electric field represented by field lines 518. In a first column (j=1), the table electrode matrix 108A comprises up to (i−1) individual capacitors $C'_{1,1}, C'_{2,1} \ldots$ to $C'_{i-1,1}$ formed by sequentially or randomly energizing adjacent electrode element pairs $(110_{1,1}/110_{2,1})$, $(110_{2,1}/110_{3,1}) \ldots$ to $(110_{i-1,1}/110_{i,1})$ along the x' axis, for example. The multiplexer/switching matrix 304 may be configured to couple the appropriate adjacent electrode element pairs $(110_{1,1}/110_{2,1})$-$(110_{i-1,1}/110_{i,1})$ to form capacitors $C'_{1,1}$-$C'_{i-1,1}$ and coupling these capacitors to the corresponding detection circuits $306_{1,1}$-$306_{i-1,1}$, which are generally shown as detection circuit 306 for clarity of illustration. As previously discussed, the individual detection circuits $306_{1,1}$-$306_{i-1,1}$ are configured to detect any capacitance change in the capacitors $C'_{1,1}$-$C'_{i-1,1}$ that may occur when the object 202 is placed proximately thereto and thus interrupting, shunting, or otherwise distorting the field lines 518 between any of the capacitors $C'_{1,1}$-$C'_{i-1,1}$. The same principles may be applied to the remaining j columns in the table capacitor matrix 510 along the y axis.

In the third mode of operation, a frame capacitor matrix 512 (C'') comprises a two-dimensional array of (i−1)×(j) individual capacitors formed by energizing neighboring electrode elements in the frame x'-y' plane, which may be parallel to the table x-y plane. As shown, a capacitor $C''_{1,1}$ sensing node may be formed by energizing adjacent neighboring electrode elements $310_{1,1}$ and $310_{2,1}$ of the frame electrode matrix 116A along the x' axis with the excitation source 302 and generating an electric field represented by field lines 520. In the first column (j=1), the table electrode matrix 116A comprises up to (i−1) individual capacitors $C''_{i-1,1}, C''_{2,1} \ldots$ to $C''_{i-1,1}$ formed by sequentially or randomly energizing adjacent electrode element pairs $(310_{1,1}/310_{2,1})$, $(310_{2,1}/310_{3,1}) \ldots$ to $(310_{i-1,1}/310_{i,1})$ along the x' axis in the x'-y' plane, for example. The multiplexer/switching matrix 304 may be configured to couple the appropriate pairs of adjacent electrode element pairs $(310_{1,1}/310_{2,1})$-$(310_{i-1,1}/310_{i,1})$ to form capacitors $C''_{1,1}$-$C''_{i-1,1}$ and coupling these capacitors to the corresponding detection circuits $306_{1,1}$-$306_{i-1,1}$, which are generally shown as detection circuit 306 for clarity of illustration. As previously discussed, the individual detection circuits $306_{1,1}$-$306_{i-1,1}$ are configured to detect any capacitance change in the capacitors $C''_{1,1}$-$C''_{i-1,1}$ that may occur when the object 202 is placed in proximately thereto and thus interrupting, shunting, or otherwise distorting the field lines 520. The same principles may be applied to the remaining j columns in the frame capacitor matrix 510.

Figure 6:
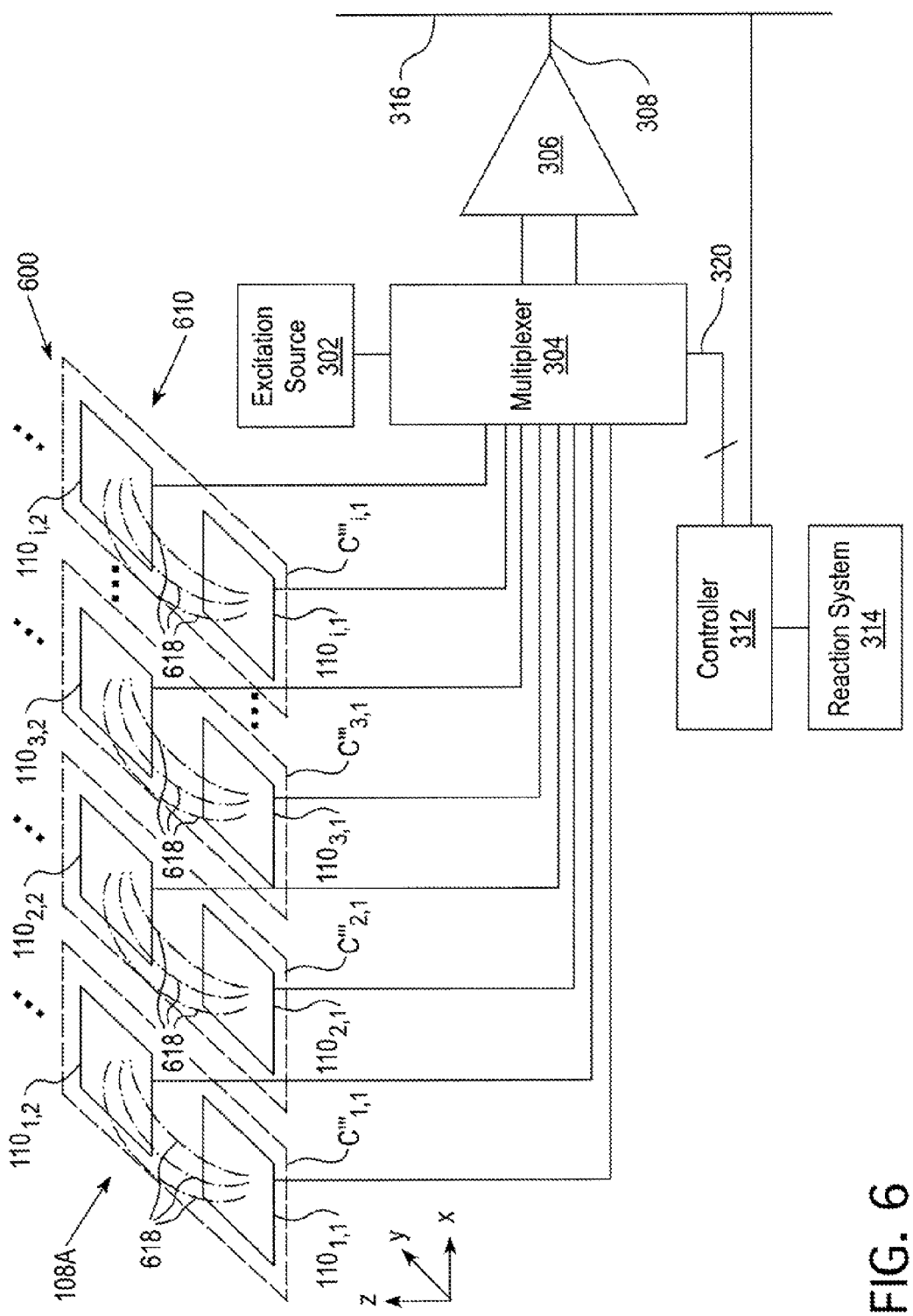
FIG. 6 illustrates one embodiment of a capacitive sensing system operating in a fourth mode.

FIG. 6 illustrates one embodiment of a capacitive sensing system 600 operating in a fourth mode. For convenience and clarity, the fourth mode of operation of the capacitor sensor matrix 308 in the capacitive sensing system 600 is described with reference to the table electrode matrix 108A portion of the capacitor sensor matrix 308. The same principles may be applied to the other portions of the table electrode matrices 108B-D.

In the fourth mode of operation, a fourth table capacitor matrix 610 (C''') comprises a two-dimensional array of (i)× (j−1) individual capacitors formed by energizing neighboring electrode elements on the horizontal x-y plane. As shown, a capacitor $C'''_{1,1}$ sensing node may be formed when the excitation source 302 energizes adjacent neighboring electrode elements $110_{1,1}$ and $110_{1,2}$ of the table electrode matrix 108A along the y' axis and generating an electric field represented by field lines 618. In the first row (i=1), the table electrode matrix 108A comprises up to (j−1) individual capacitors $C'''_{1,1}, C'''_{1,2} \ldots$ to $C'''_{1,j-1}$ formed by sequentially or randomly energizing adjacent electrode element pairs $(110_{1,1}/110_{1,2})$, $(110_{1,2}/110_{1,3}) \ldots$ to $(110_{1,j-1}/110_{1,j})$ along the y axis, for example. The multiplexer/switching matrix 304 may be configured to couple the appropriate adjacent electrode element pairs $(110_{1,1}/110_{1,2})$-$(110_{1,j-1}/110_{1,j})$ to form capacitors $C'''_{1,1}$-$C'''_{1,j-1}$ and coupling these capacitors to the corresponding detection circuits $306_{1,1}$-$306_{1,j-1}$, which are generally shown as detection circuit 306 for clarity of illustration. As previously discussed, the individual detection circuits $306_{1,1}$-$306_{1,j-1}$ are configured to detect any capacitance change in the capacitors $C'''_{1,1}$-$C'''_{1,j-1}$ that may occur when the object 202 is placed in proximity thereto and thus interrupting, shunting or otherwise distorting the field lines 618. The same principles may be applied to the remaining i rows in the table capacitor matrix 610.

Figure 7:
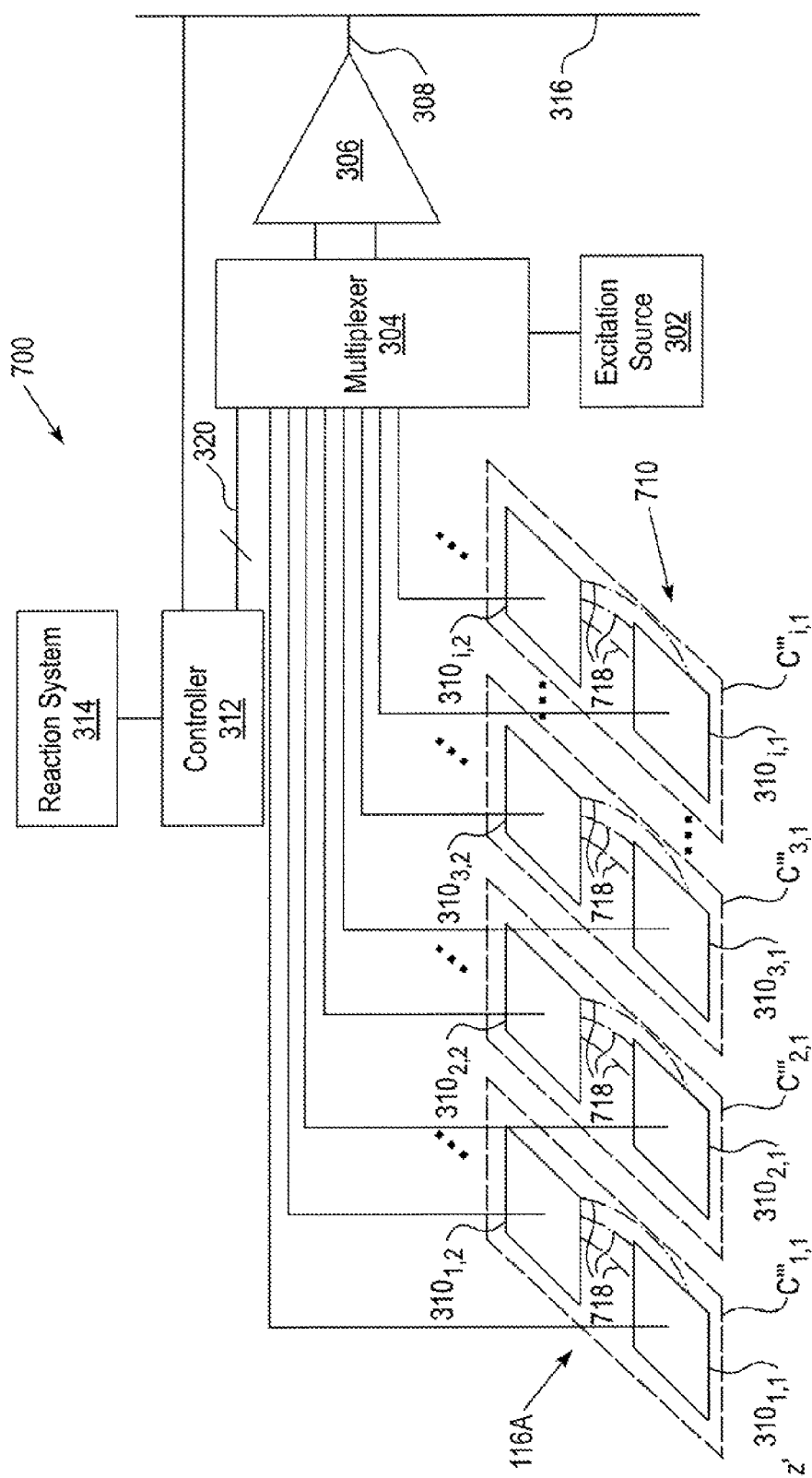
FIG. 7 illustrates one embodiment of a capacitive sensing system operating in a fifth mode.

FIG. 7 illustrates one embodiment of a capacitive sensing system 700 operating in a fifth mode. For convenience and clarity, the fifth mode of operation of the capacitor sensor matrix 308 of the capacitive sensing system 700 is described with reference to the frame electrode matrix 116A portion of the capacitor sensor matrix 308. The same principles may be applied to the other portions of the table and frame electrode matrices 116B-D.

In the fifth mode of operation, a fifth frame capacitor matrix 710 ($C''''$) comprises a two-dimensional array of (i)×(j−1) individual capacitors formed by energizing neighboring electrode elements on the horizontal x'-y' plane. As shown, a capacitor $C''''_{1,1}$ may be formed when the excitation source 302 energizes adjacent neighboring electrode elements $310_{1,1}$ and $310_{1,2}$ of the table electrode matrix 116A along the y' axis and generating an electric field represented by field lines 718. In the first row (i=1), the table electrode matrix 116A comprises up to (j−1) individual capacitors $C''''_{1,1}$, $C''''_{1,2}$ ... to $C''''_{1,j-1}$ formed by sequentially or randomly energizing adjacent electrode element pairs ($310_{1,1}$/$310_{1,2}$), ($310_{1,2}$/$310_{1,3}$) ... to ($310_{1,j-1}$/$310_{1,j}$) along the y' axis in the x'-y' plane, for example. The multiplexer/switching matrix 304 may be configured to couple the appropriate horizontally adjacent electrode element pairs ($310_{1,1}$/$310_{1,2}$)-($310_{1,j-1}$/$310_{1,j}$) to form capacitors $C''''_{1,1}$-$C''''_{1,j-1}$ and coupling these capacitors to the corresponding detection circuits $306_{1,1}$-$306_{1,j-1}$, which are generally shown as detection circuit 306 for clarity of illustration. As previously discussed, the individual detection circuits $306_{1,1}$-$306_{1,j-1}$ are configured to detect any capacitance change in the capacitors $C''''_{1,1}$-$C''''_{1,j-1}$ that may occur when the object 202 is placed proximately thereto and thus interrupting, shunting, or otherwise distorting the field lines 718. The same principles may be applied to the remaining i rows in the frame capacitor matrix 710.

In any of the embodiments described above with reference to FIGS. 1-7, the velocity of the object 202 approaching or withdrawing from the blade 104 of the power cutting tool 100 may be determined by sensing the object 202 in an outer detection zone around the blade 104. The detection zone may be formed by 108A-D or 116A-D and comprises an array of electrical conductors $110_{i,j}$ and $310_{i,j}$. The object 202 may be sensed as it traverses between a first electrical conductor $110_{1,1}$ and a second electrical conductor $110_{2,1}$ of the electrode matrix 108A, for example. Once the object 202 has been detected at the first and second electrical conductors $110_{1,1}$ and $110_{2,1}$, the controller 312 can compute the time difference between when the object was detected at the first electrical conductor $110_{1,1}$ and when the object was detected at the second electrical conductor $110_{2,1}$. The same principles may be applied to determine the velocity of the object 202 as it traverses any two or more electrical conductors of any of the electrode matrices discussed above.

It will be appreciated that, for convenience and clarity, spatial terms such as "vertical" and "horizontal" are used herein with respect to the drawings. However, the electrode matrices may be employed in many orientations and positions, and these terms are not intended to be limiting and absolute.

While various embodiments have been shown and described, it should be understood that other modifications, substitutions and alternatives are apparent to one of ordinary skill in the art. Such modifications, substitutions, and alternatives can be made without departing from the scope of the appended claims.

What is claimed is:

1. A power cutting tool comprising:
   a horizontal cutting surface;
   a moveable blade to cut an object located on the cutting surface, the blade having two lateral sides;
   a first electrode matrix on the cutting surface and comprising a first array of electrical conductors;
   a frame spaced vertically apart from and facing the cutting surface and comprising a second electrode matrix comprising a second array of electrical conductors, wherein the frame extends laterally beyond the lateral sides of the blade;
   a multiplexor connected to the first and second electrode matrices for selectively connecting an electrical conductor of the first and second electrode matrices to an energy source;
   a controller connected to the multiplexor for controlling the multiplexor such that:
      in a first mode, vertically-oriented electric fields are generated between the electrical conductors of the first electrode matrix and the electrical conductors of the second electrode matrix;
      in a second mode, lower horizontally-oriented electric fields are generated between electrical conductors first electrode matrix and upper horizontally-oriented electric fields are generated between the electrical conductor of the second electrode matrix; and
      wherein the controller automatically switches between the first and second modes; and
   a detector circuit connected to the first and second electrode matrices for detecting a presence of an object in proximity to the blade.

2. The power cutting tool of claim 1, wherein the electrical conductors of the first electrode matrix are arranged adjacent to each other and the electrical conductors of the second electrode matrix are arranged adjacent to each other.

3. The power cutting tool of claim 1, wherein first and second electrode matrices are positioned parallel to each other.

4. The power cutting tool of claim 1, further comprising:
   a reaction system coupled to the controller, the reaction system to take a danger-mitigating reaction with respect to the blade when a dangerous condition is detected by the detection circuit.

5. The power cutting tool of claim 1, wherein the electrical conductors of the first electrode matrix are arranged adjacent to each other along a first axis.

* * * * *

UNITED STATES PATENT AND TRADEMARK OFFICE
CERTIFICATE OF CORRECTION

| | | |
|---|---|---|
| PATENT NO. | : 8,122,798 B1 | |
| APPLICATION NO. | : 12/478559 | |
| DATED | : February 28, 2012 | |
| INVENTOR(S) | : David Shafer et al. | |

It is certified that error appears in the above-identified patent and that said Letters Patent is hereby corrected as shown below:

Col. 2, Line 37

Delete "may surround at least a portion the blade." and substitute therefor --may surround at least a portion of the blade.--.

Col. 12, Line 32

Delete "electrode element pairs ($310_{1,l}/310_{2,l}$)- ($310_{i-1,l}/310_{i-1,l}$)" and substitute therefor --electrode element pairs ($310_{1,l}/310_{2,l}$)- ($310_{i-1,l}/310_{i,1}$)--.

Signed and Sealed this
Twenty-sixth Day of June, 2012

David J. Kappos
*Director of the United States Patent and Trademark Office*